(12) United States Patent
Liu et al.

(10) Patent No.: US 12,468,022 B2
(45) Date of Patent: Nov. 11, 2025

(54) LASER MEASUREMENT CALIBRATION METHOD

(71) Applicant: INDUSTRIAL TECHNOLOGY RESEARCH INSTITUTE, Hsinchu (TW)

(72) Inventors: Shih-Tsung Liu, Hsinchu (TW); Yen-Hsien Lee, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 93 days.

(21) Appl. No.: 18/642,881

(22) Filed: Apr. 23, 2024

(65) Prior Publication Data
US 2025/0321328 A1    Oct. 16, 2025

(30) Foreign Application Priority Data
Apr. 10, 2024 (TW) ................. 113113219

(51) Int. Cl.
*G01S 7/497* (2006.01)
(52) U.S. Cl.
CPC ..................... *G01S 7/497* (2013.01)
(58) Field of Classification Search
CPC ........................................... G01S 7/497
See application file for complete search history.

(56) References Cited

U.S. PATENT DOCUMENTS

| | | | |
|---|---|---|---|
| 3,536,406 A | 10/1970 | Granqvist | |
| 4,276,480 A | 6/1981 | Watson | |
| 5,210,593 A | 5/1993 | Kraemer | |
| 6,281,679 B1 | 8/2001 | King et al. | |
| 6,460,004 B2 * | 10/2002 | Greer | G01B 11/2504 356/152.3 |

(Continued)

FOREIGN PATENT DOCUMENTS

| | | |
|---|---|---|
| CN | 101589290 A | 11/2009 |
| CN | 103217120 B | 3/2016 |

(Continued)

OTHER PUBLICATIONS

TW OA issued on May 27, 2025.
Zhuqing Zhang et al., "Four-Laser Bending Beam Measurements and FEM Modeling of Underfill Induced Wafer Warpage", 2004 IEEE.

*Primary Examiner* — Seung C Sohn
(74) *Attorney, Agent, or Firm* — WPAT, PC (57) ABSTRACT

A laser measurement calibration method is adapted to establish in a software program and executes the following steps after read by a computer: measuring a standard calibration element with a contact sensing device to obtain a measurement value; measuring the standard calibration element with at least one non-contact sensing device to obtain at least one surface distance value of the standard calibration element; calculating a calibration value according to the measurement value of the standard calibration element and the at least one surface distance value of the standard calibration element; measuring an object to be measured with the at least one non-contact sensing device to obtain at least on surface distance value of the object to be measured; and calculating a measurement value of the object to be measured according to the calibration value and at least one surface distance value of the object to be measured.

6 Claims, 6 Drawing Sheets

(56) References Cited

U.S. PATENT DOCUMENTS

| | | | |
|---|---|---|---|
| 9,062,963 | B2 | 6/2015 | Furuta et al. |
| 9,151,595 | B1 | 10/2015 | Cook et al. |
| 9,335,145 | B2 | 5/2016 | Sonntag et al. |
| 10,240,916 | B1 | 3/2019 | Golab et al. |
| 2006/0182383 | A1 | 8/2006 | Slotwinski |
| 2006/0271332 | A1* | 11/2006 | Loferer ............... G01B 21/042 |
| | | | 702/150 |
| 2020/0292300 | A1 | 9/2020 | Hughes |

FOREIGN PATENT DOCUMENTS

| | | | |
|---|---|---|---|
| CN | 105705907 | A | 6/2016 |
| CN | 112444210 | A | 3/2021 |
| CN | 113686242 | A | 11/2021 |
| CN | 117031486 | A | 11/2023 |
| TW | 201003034 | A | 1/2010 |
| TW | I372234 | B | 9/2012 |
| TW | I473965 | B | 2/2015 |
| TW | I629451 | B | 7/2018 |
| TW | I637806 | B | 10/2018 |
| TW | I822410 | B | 11/2023 |
| WO | WO 2013/142807 | A1 | 9/2013 |

\* cited by examiner

LASER MEASUREMENT CALIBRATION METHOD

CROSS REFERENCE TO RELATED APPLICATION

All related applications are incorporated by reference. The present application is based on, and claims priority from, Taiwan Application Serial Number 113113219, filed on Apr. 10, 2024, the disclosure of which is hereby incorporated by reference herein in its entirety.

TECHNICAL FIELD

The present disclosure relates to a calibration method, and more particularly to a laser measurement calibration method.

BACKGROUND

Contact measurement is a method that uses a measuring device (such as a sensing probe) to directly contact the surface of the object to be measured for dimensional measurement. This type of measuring equipment is commonly used in the field of geometric dimensional inspection in industrial production and manufacturing. The disadvantages of contact measurement are that it cannot continuously sample and the surface is easily damaged.

In non-contact measurement, such as laser, the laser beam is used to scan the measured object, and the distance and size are calculated based on the reflected signal. Although it has the advantages of high precision, high efficiency, and no damage to the surface. However, lasers are often interfered by environmental factors such as ambient temperature, humidity, vibration, etc., affecting measurement accuracy.

Furthermore, the material of the measured object is different, and its surface roughness, reflectivity, transparency and other physical properties will also affect the reflection and transmission of the laser signal, and further affect the measurement results. Therefore, non-contact measurement technology can only obtain a rough value (such as an average value) depending on the specific application scenario and the material of the object being measured, such that the distance measured by the laser beam will have surface measurement errors.

SUMMARY

The present disclosure provides a laser measurement calibration method, using a contact measurement result to calibrate the error of a non-contact measurement, so as to improve the accuracy of the non-contact measurement.

The present disclosure proposes a laser measurement calibration method, adapted to establish in a software program and executing the following steps after read by a computer: measuring a standard calibration element with a contact sensing device to obtain a measurement value; measuring the standard calibration element with at least one non-contact sensing device to obtain at least one surface distance value of the standard calibration element; calculating a calibration value according to the measurement value of the standard calibration element and the at least one surface distance value of the standard calibration element; measuring an object to be measured with the at least one non-contact sensing device to obtain at least on surface distance value of the object to be measured; and calculating a measurement value of the object to be measured according to the calibration value and at least one surface distance value of the object to be measured.

in order to make the present disclosure more obvious and understandable, embodiments are specifically cited below and described in detail with reference to the attached drawings.

DETAILED DESCRIPTION

The following embodiments are enumerated and described in detail with reference to the accompanying drawings, but the provided embodiments are not intended to limit the scope of the present disclosure. In addition, the drawings are for illustrative purposes only and are not drawn to original size. To facilitate understanding, the same elements will be identified with the same symbols in the following description.

The terms "including", "comprising", "having", etc. mentioned in the present disclosure are all open terms, that is, they mean "comprising but not limited to".

In the description of each embodiment, when terms such as "first", "second", "third", "fourth", etc. are used to describe elements, they are only used to distinguish these elements from each other, and there is no restriction on the order or importance of these elements.

In the description of various embodiments, the so-called "coupling" or "connection" may refer to two or more components making direct physical or electrical contact with each other, or indirectly making physical or electrical contact with each other. "Coupling" or "connection" can also refer to the mutual operation or action of two or more components.

Figure 1:
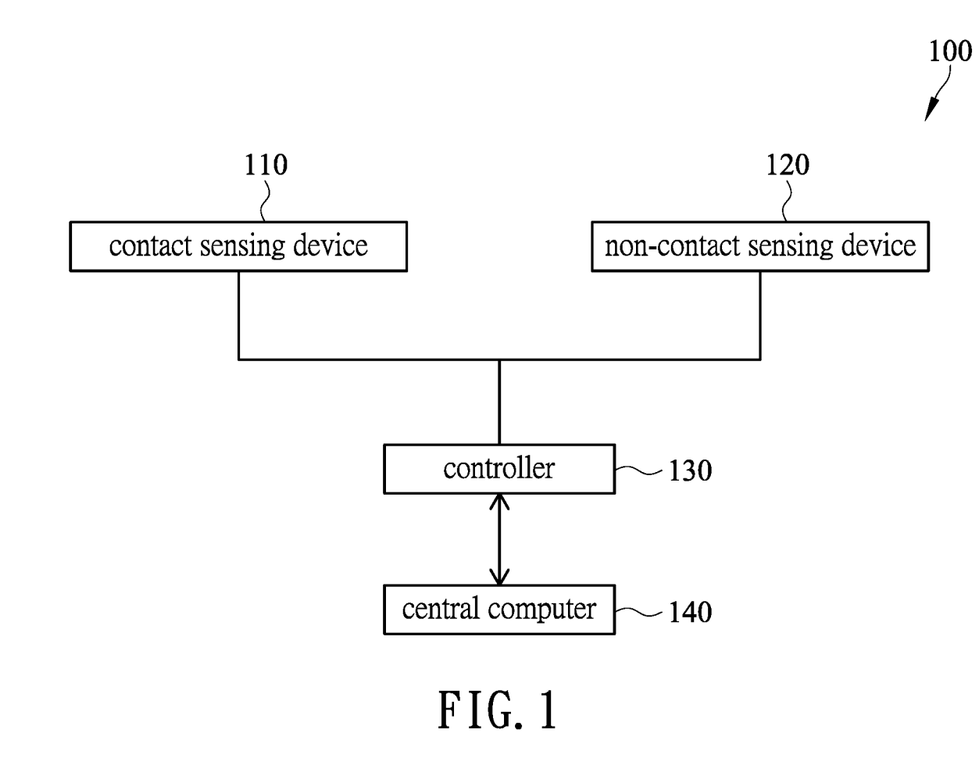
FIG. 1 is a block diagram of a measurement calibration system according to the present disclosure.

FIG. 1 is a schematic view of a measurement calibration system according to the present disclosure. Referring to FIG. 1, a measurement calibration system 100 of the present disclosure includes contact sensing device 110, a non-contact sensing device 120, a controller 130, and a central computer 140.

The central computer 140 is connected to the controller 130, thereby realizing data processing and action control of the entire measurement calibration system 100. The controller 130 may be a physical circuit to perform action control and signal transmission to drives or actuator inside various sensing devices; the central computer 140 is, for example, a computer to execute the software program stored inside; the controller 130 may be installed inside the central computer 140, or the controller 130 is built in a software program, and this software program is stored in a storage drive inside the computer and is read by the computer, for example, the central computer 140 to execute a series of expected method steps.

The contact sensing device 110 and the non-contact sensing device 120 are respectively connected to the controller 130. The present disclosure first uses the non-contact sensing device 120 for measurement, and then uses the calibration values provided by the contact sensing device 110 to correct the errors of the non-contact sensing device 120, which include microscopic error and reflection error, so as to improve the accuracy of the non-contact measurement.

The contact sensing device 110 is a device using a contact technology to directly contact the surface of an object to measure its specific properties, where the contact sensing device 110 usually uses various sensors, probes or other devices to use contact manners such as place, contact, clamp it on the object to be measured, so as to obtain the required data of the properties such as size, shape, surface roughness, and hardness.

The non-contact sensing device 120 is a device using a non-tact measurement technology usually using non-contact sensers or other devices to measure the specific properties of a body without needing to directly contact the surface of the body, such as the optical measurement of cameras, laser ranging, infrared sensing, ultrasonic sensing, electromagnetic induction, microwave sensing, and other non-contact manners, so as to obtain the specific property of the distance, position, velocity, size, shape, temperature or electric conductivity of the object.

Figure 2:
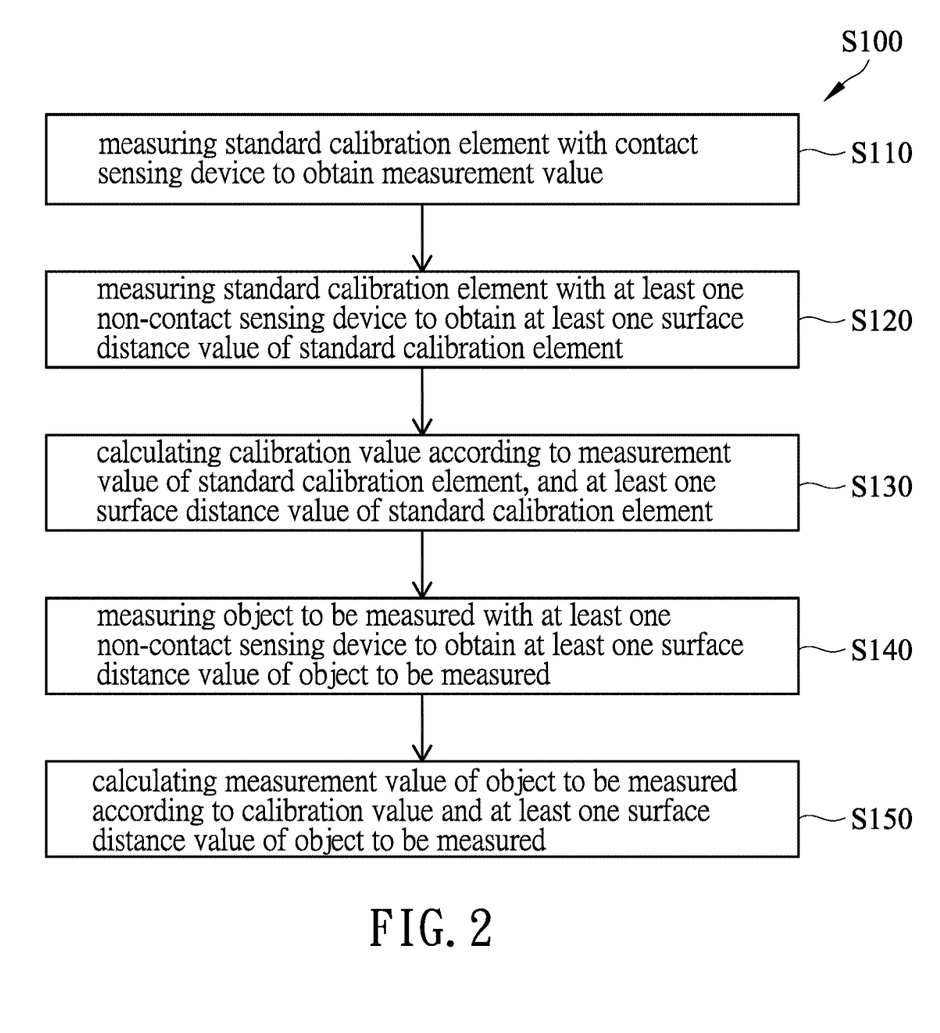
FIG. 2 is a flow chart of a laser measurement calibration system according to the present disclosure.
Figure 3:
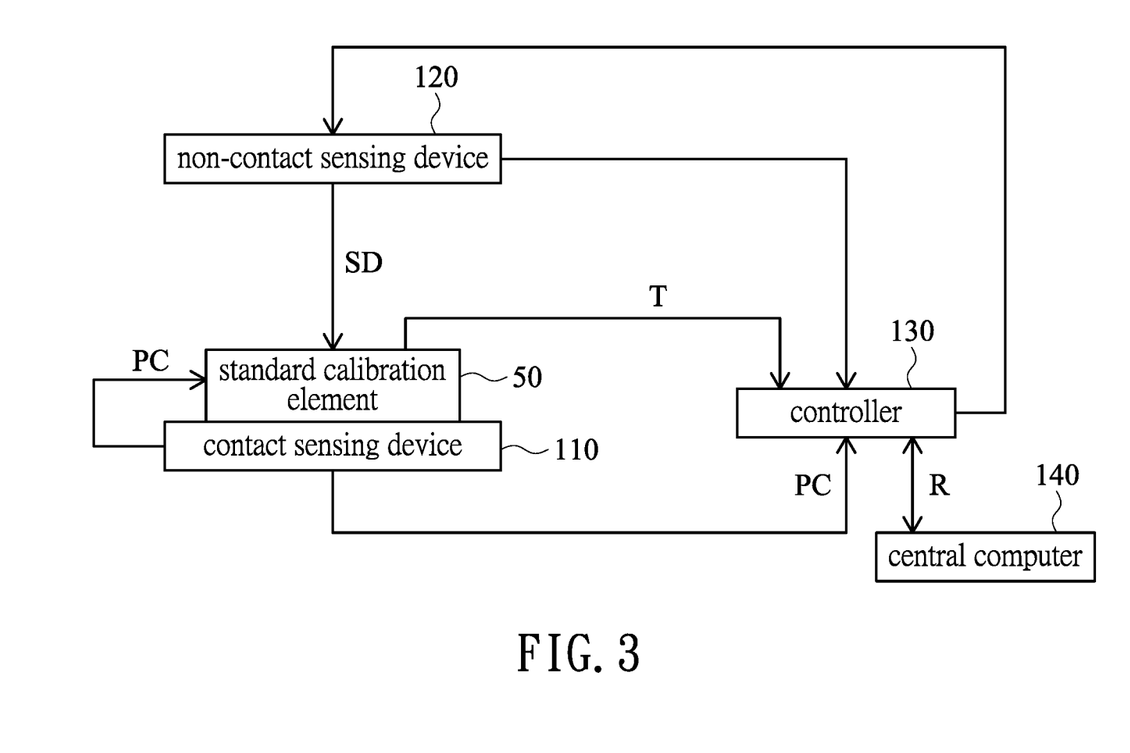
FIG. 3 is a block diagram of an embodiment of a standard calibration element being measured by a laser measurement calibration method according to the present disclosure.

FIG. 2 is a flow chart of a laser measurement calibration method of the present disclosure, and FIG. 3 is a schematic view of an embodiment of measuring a standard calibration element according to a laser measurement calibration method of the present disclosure. Referring to FIGS. 1 to 3, a laser measurement calibration method 100 of the present disclosure includes the following steps S110 to S150; this laser measurement calibration method S100 is, for example, adapted to establish in a software program or firmware program and stored inside the storage drive of a central computer 140 or a controller 130, and executed by the computer.

First, step S110 is performed, a standard calibration element 50 is measured with a contact sensing device 110 to obtain a measurement value PC. For example, the thickness value of the measured standard value 50 is used as the measure value PC. Since the actual thickness value T of the standard calibration element 50 is known, and for example accessed inside the controller 130, but since the surface is rough to cause measurement error, this surface error value is the sum of the upper surface error value and lower surface error value, so that it can be known as PC-T. The contact sensing device 110 usually uses various sensors, probes or other devices, it is placed on the standard calibration element 50 to be measured to obtain the required measurement value PC, this error can also be regarded as an error in placing or installing the object to be tested on the flat platform 70 or the machine table.

Figure 6:
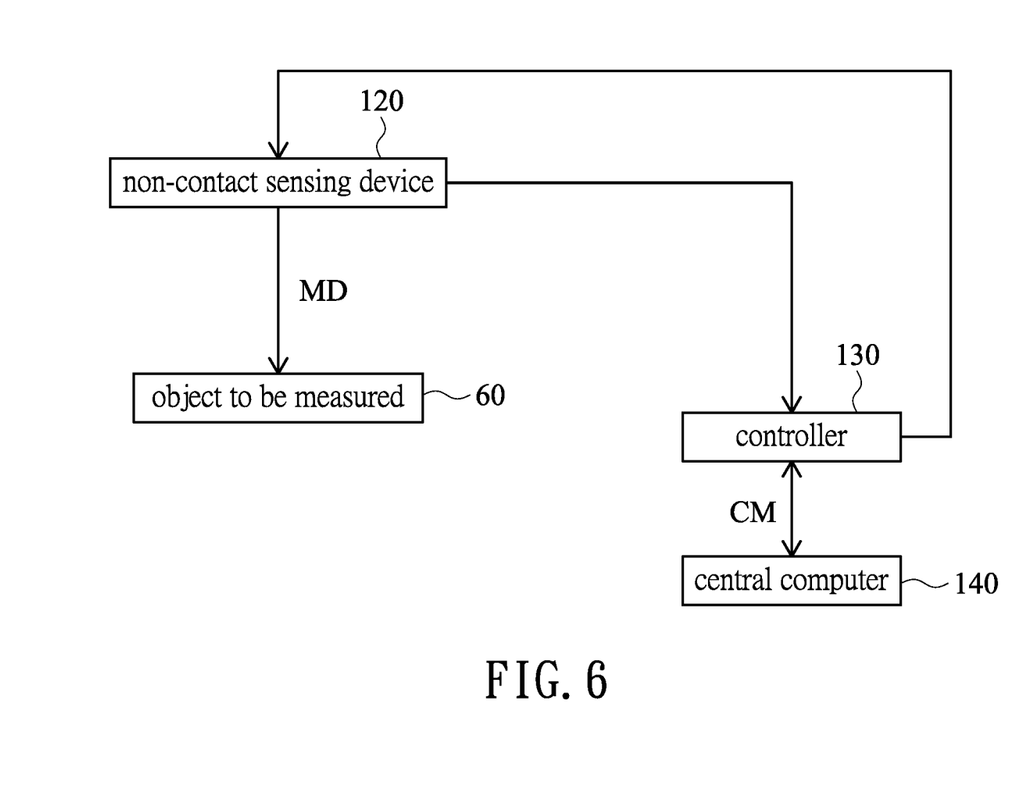
FIG. 6 is a block diagram of an embodiment of a surface distance value of an object to be measured being measured by a non-contact sensing device according to the present disclosure.

In the above step S110, an element having the same material as the object to be measured (as shown in FIG. 6) is selected to use as the standard calibration element 50. The object 60 to be measured is an object to be measured that wants to be measured with the non-contact sensing device 120 by the present disclosure, and an element having the same material as the object 60 to be measured is used as the standard calibration element 50 to reduce exception errors that may be caused by different materials It should be noted that the above standard calibration element 50 is not a standard gauge block. The present disclosure uses a material element having the same material as the object 60 to be measured as the standard calibration element 50, and its physical quantity such as surface roughness is still unknown, so that the contact sensing device 110 must be used for measurement to obtain the measurement value PC.

The following examples illustrate possible implementations of the contact sensing device 110 measuring the standard calibration element 50.

In an embodiment, for example, a material having a rough surface is used as the 20 standard calibration element 50. If the non-contact sensing device 120 (for example, laser) is used to measure a material with a rough surface, such as the metal of a steel plate, the beam emitted from laser only can obtain an average value, that is, the average value of the highest point of convexity and the lowest point of depression on the surface of a material with a rough surface. However, the contact sensing device 110 contacts the standard calibration element 50 by means of contacting to obtain the measurement value PC. Due to the fact that the contact sensing device 110 contacts the highest points on the upper and lower surfaces of the standard calibration element 50, and the values obtained from the rough surface material measured by the non-contact sensing device 120 will include surface measurement errors, this disclosure first uses the contact sensing device 110 to measure the results and correct the errors.

The above-mentioned materials with rough surfaces can be replaced by opaque materials. For example, if the metal material is total reflection, the above method can also be used for measurement.

In another embodiment, for example, a material with a bright surface is used as the standard calibration element 50. For example, a wafer is used as the standard calibration element 50. The contact sensing device 110 can use a ruby probe to contact the surface of the standard calibration element 50 to obtain the measurement value PC.

Since the wafer will have different surface reflection coefficients due to different doping materials. If the non-contact sensing device 120 is used to measure a material with bright surfaces, the laser reflectivity will be different, resulting in a gap in measurement accuracy. Therefore, the contact sensing device 110 is adopted to contact and measure the standard calibration element 50, the errors caused by the reflection will be reduced.

The above surface with a bright surface can be replaced by a light-transmissive material or a material with a smooth surface. In addition to wafers, other similar materials may also be measured with the above manner.

After step S110, step S120 is performed, at least one non-contact sensing device 120 is used to measure the standard calibration element 50 to obtain at least one surface distance value SD of the standard calibration element 50, and this value may include surface error values that may need to be corrected or calibrated.

Figure 4:
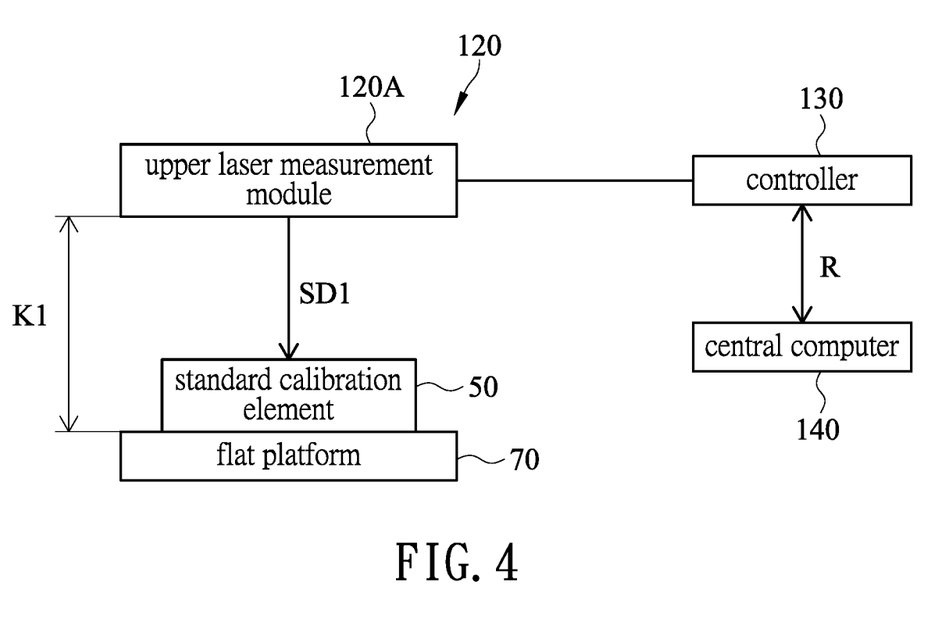
FIG. 4 is a block diagram of an embodiment of a surface distance value of a standard calibration element being measured by a non-contact sensing device according to the present disclosure.

In an embodiment, as shown in FIG. 4, the non-contact sensing devices 120 number one; it can be a upper laser measurement module 120A, for example, such as infrared sensing, ultrasonic sensing, electromagnetic induction, microwave sensing and other non-contact types, located above the flat platform 70, and the standard calibration element 50 is carried by the flat platform 70. The distance of the light beam emitted from the laser measurement module 120A to the upper surface of the standard calibration element 50 is a upper surface distance value SD1. In addition, there is a sensor spacing K1 between the upper laser measurement module 120A and the flat plate 70.

Figure 5:
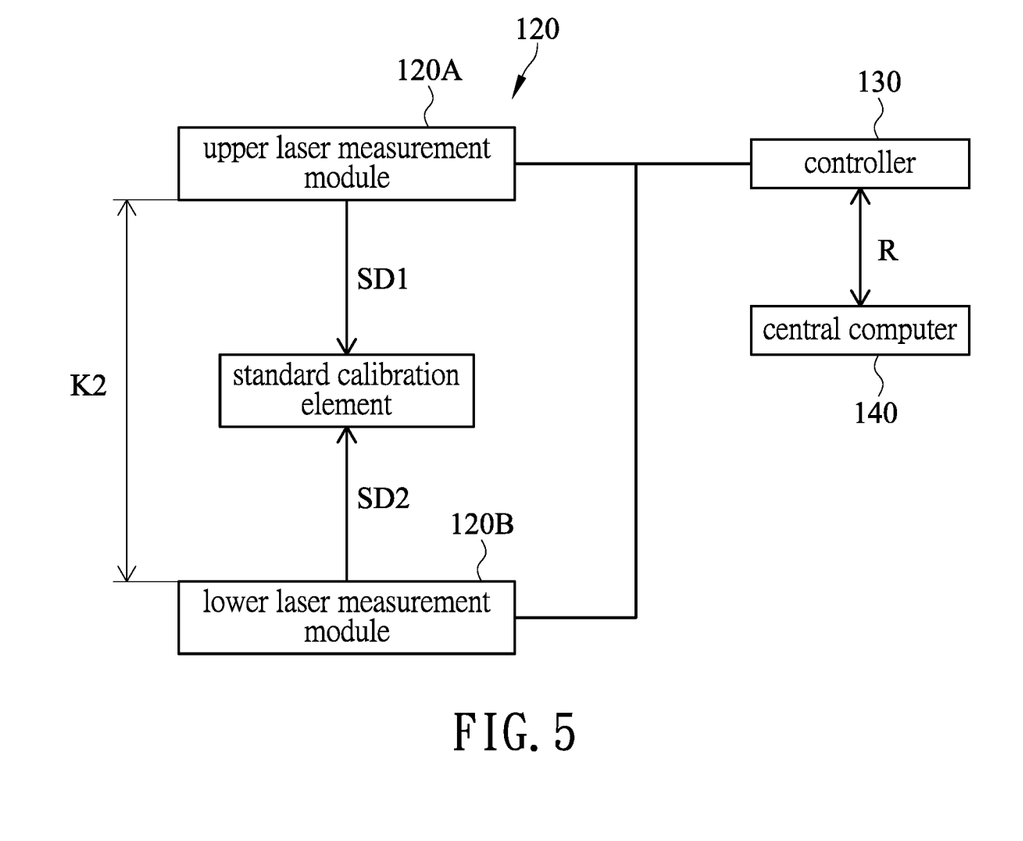
FIG. 5 is a block diagram of another embodiment of a surface distance value of a standard calibration element being measured by a non-contact sensing device according to the present disclosure.

In another embodiment, as shown in FIG. 5, the non-contact sensing devices 120 number two; they are a upper laser measurement module 120A and a lower laser measurement module 120B, for example, such as infrared sensing, ultrasonic sensing, electromagnetic induction, microwave sensing and other non-contact types, and the upper laser measurement module 120A and the lower laser measurement module 120B are respectively provided on the upper and lower sides of the standard calibration element 50, and the flat platform 70 is not shown in the figure. The distance of the light beam emitted from the upper laser measurement module '120A to the upper surface of the standard calibration element 50 is a upper surface distance value SD1, and the distance of the light beam emitted from the lower laser measurement module 120B to the lower surface of the standard calibration element 50 is a lower surface distance value SD2. In addition, there is a sensor spacing K2 between the upper laser measurement module 120A and the lower laser measurement module 120B.

Step S130 is proceeded after step S120, where a calibration value R is calculated according to the measurement value PC of the standard calibration element 50 and at least one surface distance value SD of the standard calibration element 50, and this calibration value R is obtained after the surface distance value SD is corrected. The calibration value R is the sum of at least one surface distance value SD of the standard calibration element 50 and at least one error value, where the at least one error value includes any or a combination of surface error value, assembly error value, environmental factor drift value, and reflection error value.

Taking FIGS. 3 and 4 as an example, the controller 130 receives the measurement value PC and the upper surface distance value SD1 of the standard calibration element 50. Taking thickness as an example, the measurement value PC of the standard calibration element 50 is equal to the sensor spacing K1 minus the upper surface distance value SD1. Therefore, using the upper surface distance value SD1 of the standard calibration element 50, the upper surface roughness error must be added and should be corrected to the calibration value R=K1−PC+(PC−T)=K1−T; this calibration value R only calculates the upper surface error of the standard calibration element 50, and the error of the lower surface of the standard calibration element 50 contacting the flat platform 70 is then regarded as an installation or assembly error value and needs to be considered and added.

Taking FIGS. 3 and 5 as an example, the controller 130 receives the measurement value PC, the upper surface distance value SD1 and the lower surface distance value SD2 of the standard calibration element 50. Taking thickness as an example, the measurement value PC of the standard calibration element 50 is equal to the sensor spacing K2 minus the upper surface distance value SD1 and the lower surface distance value SD2. Therefore, the sum of the surface distance values (the upper surface distance value SD1 and the lower surface distance value) should be corrected to the calibration value R=K2−T.

In an embodiment, if a material with a rough surface is used as the standard calibration element 50, and when the non-contact sensing device 120 is adopted, the error value needing to be considered, for example, including the sum of an assembly error value, an environmental factor drift value and a surface roughness measurement error value, is used as a corrected value, where the assembly error value may be an assembly error value of the contact or non-contact sensing device, a standard calibration element installation error value, an environmental factor drift value, for example, an error (for example, a laser drift value) caused due to factors such as temperature, humidity, and a vibration, and a surface roughness measurement error value, and the present disclosure does not limit its type and quantity.

In another embodiment, for example, a material with a bright surface is used as the standard calibration element 50, and the sum of the assembly error value, the environmental factor drift value and the optical reflection error value of the non-contact sensing device 120 is adopted as a correction value, where the assembly error value and the environmental factor drift value are mentioned as the above, and the material with a bright surface such as a wafer will has different reflectivity, so the reflection error value will be generated.

It should be noted that the above calibration value R can select a standard according to the material of the actual object 60 to be measured, and the calculated calibration value R can generally include the selected standard after stops S110 to S130 are performed.

In step S140, at least one non-contact sensing device 120 is used to measure an object 60 to be measured having the same material as the standard calibration element 50 to obtain at least one surface distance value MD of the object 60 to be measured, and its manner is similar to the above FIG. 4, and can also be adopted with the manner of the two non-contact sensing devices 120.

In step S140, after the surface distance value MD of the object 60 to be measured and the sensor spacing K1 are obtained, step S150 is then performed. The measurement value CM of the object 60 to be measured is calculated according to the calibration value R and at least one surface distance value of the object 60 to be measured. For example, the measurement value CM=K1−MD+(PC−T) of the object 60 to be measured is calculated according to the sum of the corrections to the error values, and this measurement value CM can be regarded as, for example, thickness value or the reflectivity value of the object 60 to be measured.

In summary, the present disclosure first calibrates the errors of the no-contact measurement through the contact measurement to improve the accuracy of the non-contact measurement. Although the present disclosure illustrates the calculations for correcting various errors as above, it does not limit the types and quantities of errors, nor can it be used to limit the subject matter and scope of the present disclosure.

Although the present disclosure has been disclosed as above in the form of embodiments, it is not intended to limit the present disclosure. Anyone with ordinary knowledge in the technical field may make some modifications without departing from the spirit and scope of the present disclosure and modifications, so the scope of protection of the present disclosure shall be subject to the scope of the claims attached.

What is claimed is:

1. A laser measurement calibration method, adapted to establish in a software program and executing the following steps after read by a computer:
    measuring a standard calibration element with a contact sensing device to obtain a measurement value;
    measuring said standard calibration element with at least one non-contact sensing device to obtain at least one surface distance value of said standard calibration element;

calculating a calibration value according to said measurement value of said standard calibration element and said at least one surface distance value of said standard calibration element;

measuring an object to be measured with said at least one non-contact sensing device to obtain at least one surface distance value of said object to be measured; and calculating a measurement value of said object to be measured according to said calibration value and at least one surface distance value of said object to be measured.

2. The method according to claim 1, further comprising the following step:

selecting an element having the same material as said object to be measured as said standard calibration element in the step of measuring a standard calibration element with a contact sensing device to obtain a measurement value.

3. The method according to claim 2, further comprising the following steps:

using said material with a rough surface as said standard calibration element; and contacting said standard calibration element by means of contacting to obtain said measurement value in the step of selecting an element having the same material as said object to be measured as said standard calibration element.

4. The method according to claim 1, wherein said calibration value is the sum of said at least one surface distance value of said standard calibration element and at least one error value.

5. The method according to claim 4, wherein said at least one error value comprises any one or a combination of a surface error value, an assembly error value, an environmental factor drift value, and a reflection error value.

6. The method according to claim 1, further comprising the following step:

measuring a thickness value of said standard calibration element as said measurement value in the step of measuring a standard calibration element with a contact sensing device to obtain a measurement value.

* * * * *